Aug. 31, 1954  C. F. WEBB  2,687,848
TAXIMETER
Filed Nov. 22, 1950  4 Sheets-Sheet 1

Inventor
CHRISTOPHER FREDERICK WEBB
By Busser & Harding
Attorneys

Aug. 31, 1954   C. F. WEBB   2,687,848
TAXIMETER

Filed Nov. 22, 1950   4 Sheets-Sheet 2

Inventor
CHRISTOPHER FREDERICK WEBB
By
Attorneys

Aug. 31, 1954  C. F. WEBB  2,687,848
TAXIMETER
Filed Nov. 22, 1950  4 Sheets-Sheet 3

*Inventor*
CHRISTOPHER FREDERICK WEBB
By
*Attorneys*

Aug. 31, 1954  C. F. WEBB  2,687,848
TAXIMETER
Filed Nov. 22, 1950  4 Sheets-Sheet 4

*Inventor*
CHRISTOPHER FREDERICK WEBB
By
*Attorneys*

Patented Aug. 31, 1954

2,687,848

UNITED STATES PATENT OFFICE 2,687,848

TAXIMETER

Christopher Frederick Webb, Harefield, Uxbridge, England, assignor to Bell Punch Company Limited, London, England, a British company Application November 22, 1950, Serial No. 196,964

Claims priority, application Great Britain December 9, 1949

20 Claims. (Cl. 235—30)

This invention relates to taximeters, by which is meant the automatic fare-computing apparatus which is used in taxicabs and like hired vehicles, in which the fare chargeable is progressively registered and displayed to the passenger.

Registration in such instruments is in terms of distance travelled and time occupied. The factor of distance travelled is usually derived from a moving part external to the meter, for example, a flexible shaft driven from some part of the vehicle transmission, having a constant speed relation to the road wheels of the vehicle in which the taximeter is installed, and the factor of time from clockwork within the instrument, which becomes effective as or when the vehicle stops whilst still engaged, the said moving part and the said clockwork being operatively connected to the fare registering mechanism of the meter through separate but associated drives thereto. For convenience in the following further description of the invention, the two drives will be referred to respectively as the "vehicle drive" and the "clock drive."

The scale of charges relative to distance and time are both subject to considerable local variation, and are generally governed by laws or regulations affecting the district in which the vehicle is employed. To the manufacturer and to the transport authorities it is therefore of considerable importance that a taximeter shall be so designed and constructed as to be readily adaptable to all such varying requiremens, without loss of the advantages of precision and reliability which can result from quantity production of a standard mechanism capable of accommodating all such requirements.

The object of the present invention is to provide an improved construction of taximeter in which these results are achieved by means which are more simple and of more comprehensive application than the known mechanisms employed, enabling in consequence the use of a robust construction for the meter and one moreover characterized by relatively small dimensions.

It is well known that in taximeters the three principal variants are (a) the initial charge and the monetary increments by which this charge is increased (i. e. the unit of registration), (b) the distance of travel allocated to a unit of registration and (c) the time interval allocated to a unit of registration, assuming the vehicle is stationary and the clockwork within the taximeter is driving the fare registering mechanism of the meter.

As regards variant (a), the monetary increments referred to may, for example, be between say 5 cents and 50 cents in decimal currency, and the usual practice is to condition the meter before installation in a particular district, with a wheel or figure band in the first digit position of the fare registering mechanism of the meter having the appropriate figures thereon.

As regards the other two variants, it is required that the distance (b) shall be set to a particular value, for example, between one-eighth of a mile and one mile, and that the time interval (c) shall also be set to a particular value, for example, between two minutes and ten minutes. The usual practice is to employ two independent trains of gear wheels in respectively the vehicle and clock drives to the fare registering mechanism, each of which has to be conditioned to the correct gear ratio (corresponding to the predetermined value of the distance (b) or as the case may be, of the time interval (c), to which the instrument has to be set), with the additional consideration that the conditioning of the train in the vehicle drive has to take into account the particular diameter of the road wheels of the vehicle in which the taximeter is to be installed and/or other possible variants affecting the distance factor. The additional consideration referred to is usually provided for by the use of a changeable gear box associated with the meter, whereby a given number of revolutions of the flexible shaft or other movable part external to the meter are first converted to a predetermined basic number of revolutions per mile (e. g. 30) to which all meters of that design under consideration are initially produced and tested.

The invention concerns all three of the variants (a), (b), (c) as will hereinafter appear, and according to its broadest aspect, resides in four principal features of novelty, which will be hereinafter referred to respectively as feature 1, feature 2, feature 3 and feature 4—feature 1 concerning variant (a), features 2 and 3 variant (b) and feature 4 variant (c).

According to feature 1, the vehicle drive to the fare registering mechanism is through a crank or eccentric in the meter, designed to rotate a predetermined basic number of revolutions per mile of travel of the vehicle and having an adjustable radius or degree of eccentricity to vary as required the distance of travel allocated to a unit of registration of the meter, the drive from said crank or eccentric being transmitted to the fare registering mechanism through an oscillating or reciprocating member drivingly engaged by the crank or eccentric.

With such a construction it is readily possible to vary the distance of travel per unit of registration of the meter, to suit the scale of charges relative to distance obtaining in the locality in which the meter is to be used and also the predetermined unit of registration of the meter, simply by adjusting as required the effective radius of the crank or, as the case may be, the degree of eccentricity of the eccentric—thereby eliminating the necessity to employ for this purpose as hitherto a train of gear wheels requiring to be conditioned initially to the correct ratio in the manner described above, and requiring substitution of one or more wheels for any subsequent change of ratio. In addition, there is the further advantage with such an arrangement that the flexible shaft or other movable part external to the meter from which the drive to the meter is obtained, can rotate in either direction, with the result that the meter is operable, or can be rendered operable, irrespectively of the direction of travel of the vehicle, or of the direction of rotation of the flexible shaft or equivalent part of the vehicle drive to the meter.

According to feature 2, the vehicle drive to the fare registering mechanism is through a ratchet wheel drive by a pawl or pawls connected to a pivot adjustable under control from the flag of the meter along an arm of a lever oscillatable under drive from the flexible shaft or other movable part external to the meter, the arrangement being such that adjustment of the pivot along the arm varies the throw of the pawl or pawls and therefore the extent of operative movement of the parts of the fare registering mechanism.

In this way a construction, eminently suitable for application to a standard quantity produced meter, is readily provided in which all three of the following requirements may be met by simple means not involving the removal or replacement of components:

(1) The requirement that the distance of travel of the vehicle per unit of registration of the meter shall be predeterminable, and if necessary variable under flag control, to suit the particular conditions of use of the meter.

(2) The requirement that the flag control of the meter shall be capable of providing, if necessary, more than one ratio of distance of travel of the vehicle to unit of registration of the meter.

(3) The requirement that registration shall occur only when the flag of the meter is in the "Engaged position."

Thus, as regards requirement (1), the position of the pivot aforesaid along the arm of the associated lever determines the distance of travel of the vehicle per unit of registration of the meter (assuming all other factors relative to the vehicle drive of the meter remain the same). Therefore, by appropriately selecting this position it is possible, within the limits of adjustment provided by the construction, to predetermine as required the operative position of the pivot and therefore the extent of operative movement of the parts of the fare registering mechanism per mile of travel of the vehicle, and thus, conversely, the distance of travel of the vehicle per unit of registration of the meter, to accord with the tariff rate at which the meter is required to operate. Similarly, by varying said position under the control of the flag, it is possible to vary the distance of travel per unit of registration to any extent required, within the limits of adjustment provided by the construction.

Then as regards requirement (2), it follows from what has been stated as regards requirement (1), that by simply shifting the pivot from one operative (meter registering) position to another along the arm, under the control of the flag, it is possible to change the ratio of distance of travel to unit of registration from one predetermined magnitude to another, for example, from a magnitude appropriate to use of the meter by day to another appropriate to use of the meter by night.

Finally, as regards requirement (3), it is possible by providing an arrangement in which the range of possible adjustment of the position of the pivot along the arm is such as to include a position in which the pivot is in axial alignment with the pivot of the lever, to arrange that registration shall occur only when the flag of the meter is in the "Engaged" position, since when the pivot is in axial alignment with the pivot of the lever no movement is imparted to it by the oscillation of the lever and consequently no registration occurs; registration only occurs when the pivot is displaced from the pivot of the lever, the flag being then in the "Engaged" position.

According to feature 3, the vehicle drive to the fare registering mechanism is through a ratchet wheel driven by a pair of simultaneously reciprocatable pawls imparting drive alternately to the wheel in such a manner as to cause substantially continuous rotation thereof.

An important advantage with such a construction is that the torque in the flexible shaft or other movable part external to the meter from which the drive is obtained, is more uniform than it would be with an arrangement employing a single reciprocatable (driving) pawl and a stationary detent pawl.

According to feature 4, the clock drive to the fare registering mechanism is through gearing occupying an exterior position relatively to the meter framework and consisting of a pair of gear wheels in respectively driving and driven relation to one another through the intermediary of a third wheel, which third wheel is meshable with the two first mentioned wheels and is so floatably mounted in relation thereto as to be capable of rolling out of mesh with the driven wheel when that wheel is over-running the driving wheel (due to the vehicle drive to the fare registering mechanism of the meter over-running the clock drive thereto), at least one of the first mentioned wheels being changeable on its mounting with another having a different number of teeth and the third wheel being further so mounted as to be shiftable relatively to the driving wheel to accommodate as necessary the gear wheel change.

In this way a simple means is provided for conditioning the meter in respect of the time factor without the necessity to employ ratchet pawls and like relatively complicated devices for this purpose. Also an arrangement is provided in which it is readily possible to vary the time interval allocated to the unit of registration of the instrument, simply by changing one or both of the gear wheels in driving and driven relation to one another, with another or others having a different number of teeth, thereby changing the gear ratio as between the two wheels, and as necessary shifting the position of the intermediate wheel on its mounting to accommodate the gear wheel change.

According to a generally preferred form of the invention, the intermediate wheel may be mounted on a radius arm along which it is adjustable to accommodate the gear change and which is freely revoluble, so as to render the intermediate wheel rollable out of mesh with the driven wheel, about the axis of the driving wheel, the driving wheel and the driven wheel being respectively mounted upon a driving shaft driven by the clockwork of the meter and a driven shaft in driving connection with the fare registering mechanism of the meter.

The invention contemplates the conjoint embodiment of any two or more of the foregoing principal features 1, 2, 3, and 4. These and other objects of the invention will become apparent from the following description when read in conjunction with the accompanying drawings in which:

The taximeter shown comprises a general framework consisting of side plates 1, 2, rigidly braced together by cross members 3.

Mounted upon this framework is the fare registering mechanism of the meter. This mechanism forms no part of the present invention. It will, therefore, not be further described save to remark that it comprises a series of digit drums, 4, 5, 6, and an associated system of driving members therefor driven by a shaft 7 through the intermediary of a cam 8 thereon, and an associated cam follower lever 9 pivotally mounted on the side plate 1 of the framework of the meter.

At any given moment in the operation of the meter, the shaft 7, which constitutes the "driven" shaft hereinbefore referred to in connection with feature 4, is driven either from a movable part as hereinbefore referred to, external to the meter and having a constant speed relation to the road wheels of the vehicle in which the meter is installed, the drive from said part being transmitted through a series of parts constituting together a "vehicle drive" as hereinbefore referred to, or from a clock mechanism incorporated in the meter, the drive in this latter case being transmitted through another series of parts constituting together a "clock drive" as hereinbefore referred to—according to whether the vehicle is in motion or stationary, or, if the vehicle is in motion, according to which of the two sources of drive is running the faster.

The vehicle drive is through the intermediary of a shaft 22 designed to rotate through a predetermined number of revolutions per mile of travel of the vehicle in which the meter is to be installed (e. g. 30), irrespective of the size of the road wheels thereof and other factors affecting the distance of travel of the vehicle per unit of registration of the meter.

The drive to the shaft 22, which can be derived from any movable part having a constant speed relation to the road wheels of the vehicle, for example, a flexible shaft (not shown) driven from some part of the vehicle transmission, is through a conversion unit designed to convert the number of revolutions per mile of said part to the basic number (e. g. 30) of the shaft 22.

Figure 9:
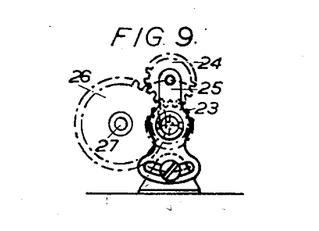
Figure 9 is an elevation of a conversion unit which may be incorporated in the meter structure or formed separately therefrom.
Figure 10:
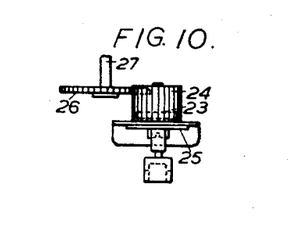
Figure 10 is a plan view of the conversion unit shown in Figure 9.

This unit, which can either be incorporated in the meter structure or be formed as an entity separate therefrom, according to requirements, is illustrated in Figures 9 and 10. It comprises an input wheel 23 meshing with an intermediate pinion 24 carried on the free end of a radius arm 25 angularly adjustable about an axis coincident with the axis of rotation of the wheel 23, and an output wheel 26 coaxial and fast with a shaft 27 and removably mounted thereon so as to be readily changeable with another having a different number of teeth. The shaft 27 is drivingly connected to the shaft 22 through gearing (not shown), the arrangement being such that the two shafts rotate through the same number of revolutions per mile of travel of the vehicle, and the input wheel 23 has the same number of teeth as the basic number of revolutions (say 30) per mile of the shaft 22. If, therefore, the number of teeth in the output wheel 26 is the same as the number of revolutions per mile of the flexible shaft (or equivalent movable part) from which the input wheel 23 is driven, the ratio will always be correct. For example, if the flexible shaft rotates through 73 revolutions per mile and if the output wheel 26 has accordingly 73 teeth, it will produce 30 revolutions per mile of the shaft 22.

With such an arrangement, the only information required regarding the transmission, in installing a standard meter constructed in accordance with this invention in a particular vehicle, for use either in this country or abroad, is the number of revolutions of the flexible shaft (or equivalent movable part) for each mile or kilometre of travel of the vehicle—which number will depend, inter alia, upon the diameter of the road wheels of the vehicle. Having been given this information, it is only necessary, in order to condition the meter for installation, to substitute therein, as required, one wheel 26 for another having the requisite number of teeth.

From the shaft 22 the drive is through a crank of adjustable radius, constituted by a wheel 28 coaxial and fast with shaft 22, having upon the face of it a pin disc 29 secured at the centre thereof to the face of the wheel by a clamping screw 30, the pin disc being angularly adjustable about the axis of the screw 30 to vary as required (according to the tariff rate in the use of the meter) the distance of the pin 31 of the disc from the axis of the wheel 28 and, therefore, the effective radius of the crank.

The pin 31 works in a slot 32 in one arm 33 of a bell crank 34 oscillatable in a vertical plane about a fixed axis 35 in consequence of rotation of the crank.

Figure 5:
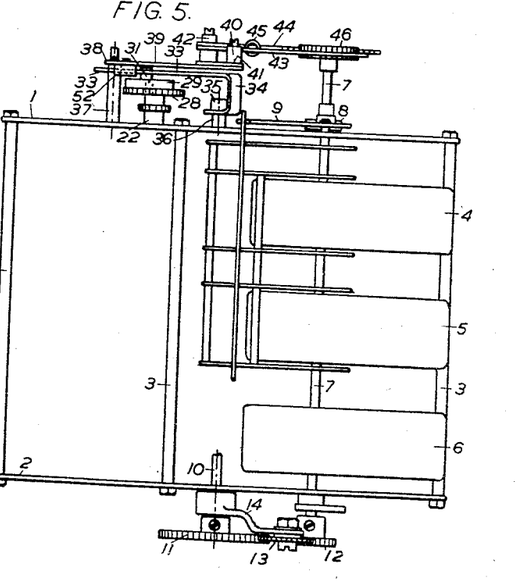
Figure 5 is a plan view of the meter.

The bell crank 34 is mounted upon a pivot 35 projecting from the face of the side plate 1 of the framework of the meter and it is of the bent form in the plan view of the meter, clearly indicated in Figure 5. In virtue of said bent form, space is left between the slotted arm 33 and the plate 1 for the accommodation of the crank of adjustable radius.

Also projecting from the face of the side plate 1 is a second pivot 37 upon which is mounted so as to have a freedom for angular movement in a vertical plane, a second bell crank 38 one arm of which is pivotally connected at the free end thereof by a pivot 40 to the upper end of a downwardly extending link 41.

Carried upon the lower end of the link 41 is a pivot 42 pivotally connecting together, at the right hand end of the pawls (in Figures 1 to 3), a pair of simultaneously reciprocatable but alternatively operable rack pawls 43, 44, normally urged by a tension spring 45 into operative engagement with the teeth of a ratchet wheel 46 coaxial and fast with the shaft 7.

As shown, the pivot 42 extends through a curved slot 47 in the other arm 48 of the bell crank 34 and its position along this slot is determined by the angular setting of the bell crank 38.

Figure 1:
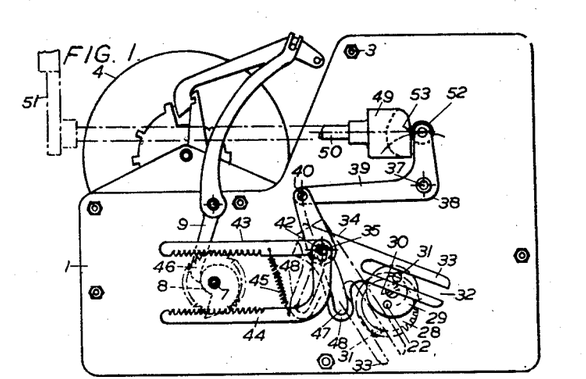
Figure 1 is a side elevation of the meter showing the parts of the vehicle drive in a "zero registration" setting and showing two positions of the parts, one shown in solid lines and one in construction lines, corresponding respectively to two angular positions 180° apart from one another of the adjustable crank.

Thus, in Figure 1, which as already stated, shows the parts in the "zero registration" setting thereof, the pivot is at the upper end of the slot, in which position it is in axial alignment with the pivot 35, with the result that oscillations of the bell crank 34 produce no movement of the pivot 42 and, therefore, no operative movement of the parts of the fare registering mechanism.

Figure 2:
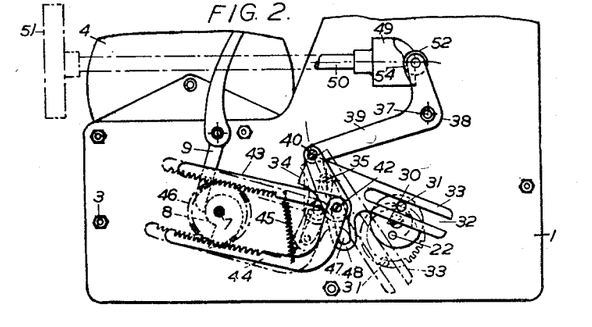
Figure 2 is a side elevation of a meter showing the parts of the vehicle drive in a "normal tariff" setting and showing two positions of the parts, one shown in solid lines and one in construction lines, corresponding respectively to two angular positions 180° apart from one another of the adjustable crank.

In Figure 2, which shows the pivots in the "normal tariff" setting thereof, it is midway along the slot, with the result that it has imparted to it at each oscillation of the bell crank 34 a reciprocatory movement about the axis of the pivot 40. Such reciprocation of the pivot 42 produces corresponding reciprocation of the pawls 43, 44, with resulting rotation of the ratchet wheel 46 and operative movement of the parts of the fare registering mechanism to an extent which is proportional to the throw of reciprocation of the pawls.

Figure 3:
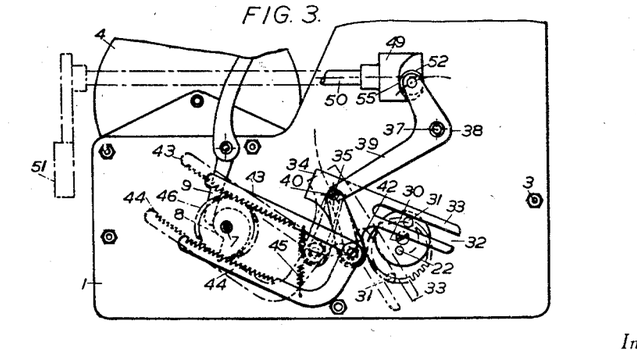
Figure 3 is a side elevation of a meter showing the parts of the vehicle drive in a "maximum tariff" setting and showing two positions of the parts, one shown in solid lines and one in construction lines, corresponding respectively to two angular positions 180° apart from one another of the adjustable crank.
Figure 4:
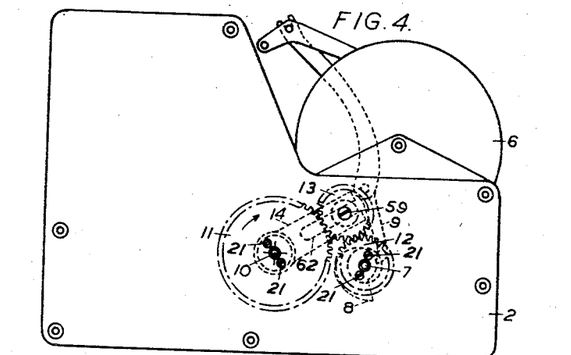
Figure 4 is a side elevation of the opposite side of the meter from that shown in Figures 1–3.

In Figure 3, which shows the parts in the "maximum tariff" setting thereof, the pivot 42 is at the bottom of the slot, with the result that the throw of the reciprocatory movement of the pawls and, therefore, the extent of operative movement imparted to the moving parts of the fare registering mechanism, is approximately twice what it is when the parts are in the "normal tariff" (Figure 2) setting thereof.

Obviously, the two operative positions of the pivot 42 along the slot 47, corresponding respectively to the "normal tariff" and "maximum tariff" settings of the parts, may be anywhere therealong, according to the tariff rate. Also there may if desired be more than two operative positions (i. e. additional to the "zero registration" position) along the slot, according to the requirements of the meter.

The angular setting of the bell crank 38 is in turn determined by the angular setting of a cam 49 coaxial and fast with a horizontal cam shaft 50 carrying at the end thereof remote from the cam the "flag" of the meter, which is marked 51.

Thus in Figure 1, which shows the flag in the "For Hire" position, a cam follower roller 52 revolubly mounted on the free end of the upstanding arm of the bell crank 38 is engaging a high part 53 of the track of the cam. In Figure 2, which shows the flag in the normal-tariff "Engaged" position, the roller is engaging an intermediate part 54 of the track. In Figure 3, which shows the flag in the maximum-tariff "Engaged" position, the roller is engaging a low part 55 of the track.

According to the required positions of the pivot 42 along the slot 47, in the various settings of the parts, which positions as indicated will depend upon the tariff rate or rates corresponding to these settings, so is determined the course of the track of the cam 49. Consequently, by choosing a suitable cam, as regards track course thereof, it is possible to condition the meter to accommodate the requirements of any particular tariff rate or set of tariff rates to obtain in the use of the meter. In view of this, the cam 49 is preferably so mounted on the shaft 50 as to be readily removable therefrom for purposes of interchangement with another having a different track course.

It will be seen that at each revolution of the adjustable crank (28, 29, 31) and, therefore, at each reciprocation of the pivot 42, first the pawl 43 and then the pawl 44 operate to impart a measure of rotation to the ratchet wheel 46, pawl 43 so operating during the left-ward (in Figures 1 to 4 and Figures 7 and 8) stroke of the reciprocation and pawl 44 during the right-ward stroke, the operative pawl in any given stroke functioning at the end thereof as a detent for the ratchet wheel until the other pawl takes over the drive. With such an arrangement the motion imparted to the shaft 7 and therefore to the moving parts of the fare registering mechanism during the operation of the meter (as regards the distance drive thereof), is more uniform than it would be if the ratchet wheel 46 were driven by a single reciprocatable pawl cooperating with a stationary detent pawl, and in consequence there is less strain on the flexible shaft or other transmission member used to transmit the vehicle drive to the meter, than there would be with an arrangement employing a single reciprocatable pawl as referred to.

It will also be seen that with two alternatively operative pawls as in the above arrangement, the ratchet wheel can receive a minimum displacement of half a tooth for each stroke of reciprocation of the pawls, and therefore of one whole tooth for each complete cycle of revolution of the adjustable crank. If, consequently, the crank makes 30 revolutions per mile of travel of the vehicle, the ratchet wheel will be given one complete turn per mile, and by adjustment of the stroke of the pawls (by adjustment as required of the effective radius of the adjustable crank from the radius corresponding to the minimum displacement of the ratchet wheel per half-cycle of the crank), this can be increased in every single multiple of 1 up to the maximum required, with corresponding reduction of the proportional distances of travel of the vehicle per unit of registration, from 1 (corresponding to said minimum displacement of the ratchet wheel) to 1/2, 1/3, 1/4, 1/5, 1/6, 1/7, 1/8, etc. before installation of the meter, therefore, the effective radius of the crank is adjusted as required, with the flag in the normal-tariff "Engaged" position, to give the required unit distance of travel of the vehicle.

Figure 7:
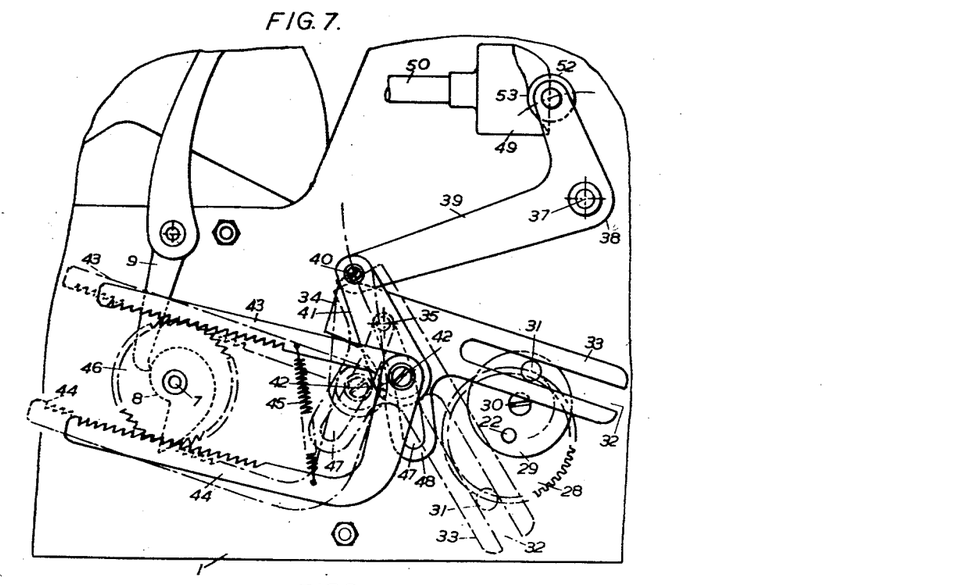
Figures 7 and 8 are elevations of a portion of Figure 2 drawn on an enlarged scale and showing two angular settings of the pin and of the adjustable crank.
Figure 8:
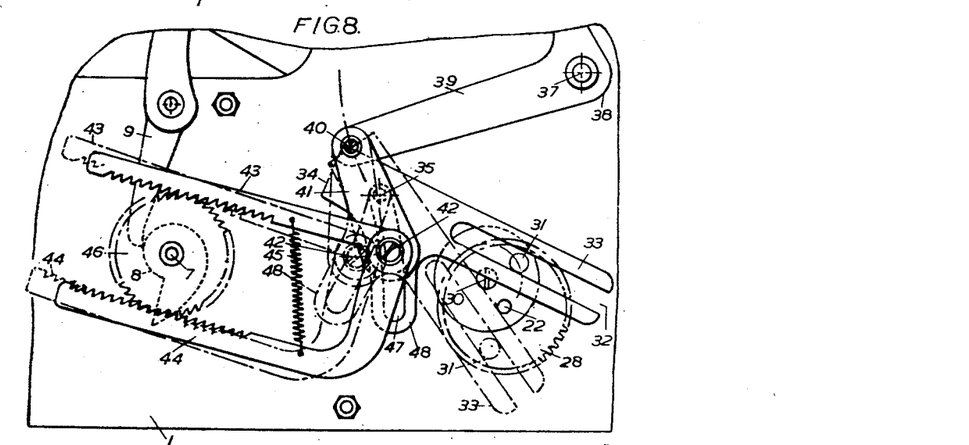

The effect of such adjustment of the effective radius of the crank is shown clearly in Figures 7 and 8, Figure 8 showing the pin disc 29 of the crank turned through approximately 90° (about the axis of the screw 30) from the position in which it appears in Figure 7, and the corresponding reduced throw of the pawls as compared with the throw in Figure 7.

The clock drive (the clockwork mechanism of which is not shown in the drawings) is through the intermediary of a shaft 10, the shaft 7, a gear wheel 11 on the shaft 10, a second gear wheel 12 on the shaft 7 and an intermediate wheel 13 adjustable along a radius arm 14 having a freedom for angular movement about the axis of the shaft 10 by being mounted on the outside of a bearing sleeve 15 (Figure 6) affixed to the side plate 2, the arm being formed at the inner end thereof with a cylindrical boss 17 girthing the sleeve 15 with a free revoluble fit therewith. The shaft 10 constitutes, as will be understood, the "driving" shaft hereinbefore referred to in the description of feature 4.

Figure 6:
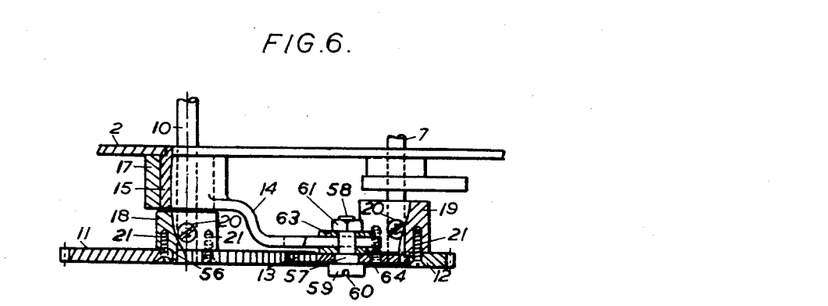
Figure 6 is an enlarged fragmentary showing of Figure 5.

The gear wheels 11, 12, which as shown occupy an exterior position relatively to the general framework of the meter, are removably mounted upon the respective shafts 10, 7 through the intermediary of cylindrical blocks 18, 19 thereon firmly held in place on the respective shafts by screws 20, 20, the wheels being secured to the blocks by fixing screws 21, 21, readily accessible from a position exterior to the framework of the meter, in the manner clearly shown in Figure 6. The blocks 18, 19 are formed at the centre thereof with a cylindrical spigot portion 56 which extends through a centre hole in the corresponding gear wheel and serves to locate the gear wheel accurately with respect to the corresponding shaft.

The intermediate wheel 13 is freely revoluble on a bearing portion 57 of the shank of a pin 58, said bearing portion being located adjacent a head 59 on the pin formed with a saw cut 60 for engagement with a screwdriver or the like in the operation of loosening a clamping nut 61 screwed on to the end of the pin remote from the head, and the converse operation of tightening the said nut, in the event of it being necessary to shift the position of the intermediate wheel along the radius arm to accommodate a change of one or other or both of the gear wheels 11, 12.

As shown, the radius arm 14 is formed with a slot 62 extending along it from the free end of the arm and the portion of the shank of the pin 58 adjacent the bearing portion 57 thereof extends through this slot, with the interposition between the nut 61 and the bearing portion 57 on the one hand and the radius arm on the other of a pair of clamping washers 63, 64, which become firmly gripped along with the radius arm between the nut and the bearing portion when the nut is screwed home. The wheel 13 remains free, however, when the nut is screwed home, owing to the fact that the axial length of the bearing portion 57, and therefore the distance between the underside of the head 61 and the face opposed thereto of the washer 64, is slightly greater than the axial length of the wheel.

If the vehicle should be stationary, with the flag of the taximeter in the "Engaged" position and therefore with the clockwork of the instrument in operation, the shaft 10 will be rotating (under drive from the clockwork), the pawls 43, 44 will be stationary and the shaft 7, and therefore the fare registering mechanism of the instrument, will be driven by drive from the shaft 10 clockwise (Figure 4) through the intermediary of the gearing 11, 13, 12, the rate at which the shaft 7, and therefore the fare registering mechanism, will be driven being dependent upon the gear ratio of the wheels 11, 12, either or both of which can be changed for another or others having a different number of teeth, with consequent variation of the time interval allotted per unit of registration of the taximeter. Such rotation of the shaft 7, with accompanying rotation of the ratchet wheel 46, is possible by reason of the fact that the pawls 43, 44 are only yieldably maintained in operative mesh with the ratchet wheel, by the spring 45 which permits the ratchet wheel to ride out of mesh with the pawls during said rotation of the shaft.

If the vehicle should be in motion, with the flag of the meter in the "Engaged" position, but so slowly that the shaft 10 over-runs the shaft 7 the ratchet wheel 46 will in a similar way ride out of mesh with the pawls.

If again the vehicle should be in motion, with the flag of the meter in the "Engaged" position, and the speed of the vehicle should be such that the peripheral speed of the wheel 12 over-runs that peripheral speed of the wheel 11 the effect of this over-running will be to cause the intermediate wheel 13 to roll out of mesh with the wheel 12 while remaining in mesh with the wheel 11, such rolling out of mesh of the wheel 13 being due to the fact that that wheel is floatably mounted so as to have a freedom for angular movement about the axis of the shaft 10 and therefore of the wheel 11, and the thrust exerted by the wheel 12 causes the wheel 13 to walk up on the wheel 11 until it moves out of mesh with the wheel 12.

It will be appreciated from the foregoing description of the invention that there are in effect two "basic constants" in the dual drive to the fare registering mechanism of the meter, (1) the shaft 22 and (2) the shaft 10, which latter shaft, being driven by the clockwork of the meter, always rotates at a constant speed, and that in designing a meter in accordance with the invention the two components of the dual drive, namely the vehicle drive and the clock drive, are designed and coordinated on the basis of these two constants.

It will also be appreciated that the particular embodiment of the invention above described embodies, as already remarked, all four of the principal features 1, 2, 3, 4 of the invention.

Thus, as regards feature 1, use is made as the primary agent for registration of distance, of a crank or eccentric (28, 29, 31) which is rotatable through a predetermined basic number of revolutions per mile or kilometre of travel of the vehicle and is of adjustable effective radius or degree of eccentricity, with the advantages of such an arrangement hereinbefore set forth.

As regards feature 2, use is made in the vehicle drive, of a particularly simple form of pawl and ratchet mechanism (43, 44, 46) under the control of the flag of the meter, the arrangement being one in which registration occurs only when the flag is in the "Engaged" position and in which, moreover, more than one ratio of distance of travel of the vehicle to unit of registration of the meter is provided for solely under the flag control (through cam 49, lever 38 and link 41) and therefore without the necessity to substitute components.

As regards feature 3, use is made in the vehicle drive, of a pawl and ratchet mechanism (43, 44, 46) so designed (by reason of the alternate operation of the pawls on the ratchet) as to result in substantially uniform rotation being imparted to the ratchet wheel and therefore to the movable parts of the fare registering mechanism.

As regards feature 4, use is made in the clock drive of a particularly simple and convenient form of means for adjusting as required the time interval allocated to a unit of registration of the meter without the necessity to dismantle the meter, the change wheels 11, 12 which for the purposes of varying the time interval are changed with other wheels having a different relative number of teeth, being situated with their securing means exteriorly of the general framework of the meter in the manner hereinbefore set forth.

It will further be appreciated that the general effect of embodying all four of the above mentioned features in one and the same taximeter is to produce a design of meter which is readily adaptable by simple adjustments, all of them performable without dismantlement of the meter, to all of the varying requirements of a taximeter consequent on local variations of tariff rates relative to distance and time, and which, therefore, can be employed as a standard design for quantity production.

Various modifications are possible. For example, the meter may be designed with oppositely reciprocating pawls instead of with pawls which reciprocate in the same direction. Also instead of providing a "zero registration" position for the pivot 42 along the slot 47, zero registration may be obtained by moving the pawls out of engagement with the ratchet wheel, e. g. by a cam operating against the spring 45 and operatively connected to the flag of the meter, as through the intermediary of the cam 49 and bell crank 38. Again, the adjustable crank may take any other convenient form than that employed in the particular embodiment of the invention described. Also instead of a crank an eccentric may be employed. All such modifications are to be understood to be within the scope of the invention as delineated in the following statement of claims.

What is claimed is:

1. A taximeter adapted for installation in a vehicle including a fare registering mechanism, means driven by said vehicle for operating said fare registering mechanism, said means comprising an eccentrically mounted driving element adapted to be driven a predetermined number of revolutions for each unit of distance travelled by the vehicle, a first oscillating member driven by said driving element, a second oscillating member, a pivotal connection between said oscillating members, said second oscillating member being driven by said first oscillating member through said pivotal connection and being in driving engagement with said fare registering mechanism, and manually operated mechanism for selectively adjusting the position of said pivotal connection with respect to the axis of oscillation of said first oscillating member to vary the extent of travel of said second oscillating member in response to the travel of said first oscillating member, said manually operated mechanism including a cam positioned by a manually operated member extending outside of the meter case and a lever positioned by said cam, said lever positioning said pivotal connection, the extent of operative movement of said fare registering mechanism in relation to the distance travelled by the vehicle being adjustable by manually controlled adjustment of the position of said pivotal connection.

2. A taximeter adapted for installation in a vehicle including a fare registering mechanism, means driven by said vehicle for operating said fare registering mechanism, said means comprising an eccentrically mounted driving element adapted to be driven a predetermined number of revolutions for each unit of distance travelled by the vehicle, a first oscillating member driven by said driving element, a second oscillating member, a pivotal connection between said oscillating members, said second oscillating member being driven by said first oscillating member through said pivotal connection and being in driving engagement with said fare registering mechanism, and manually operated mechanism for selectively adjusting the position of said pivotal connection with respect to the axis of oscillation of said first oscillating member to vary the extent of travel of said second oscillating member in response to the travel of said first oscillating member, said manually operated mechanism including a cam selectively positioned to any one of three operating positions by a manually operated member extending outside of the meter case and a lever positioned by said cam, said lever positioning said pivotal connection in one of three predetermined positions, the extent of operative movement of said fare registering mechanism in relation to the distance travelled by the vehicle being determined by the manual selection of one of the three cam operating positions.

3. A taximeter adapted for installation in a vehicle including a fare registering mechanism, means driven by said vehicle for operating said fare registering mechanism, said means comprising an eccentrically mounted driving element adapted to be driven a predetermined number of revolutions for each unit of distance travelled by the vehicle, a first oscillating member driven by said driving element, a slot in said first oscillating member extending from the axis of oscillation of said member, a second oscillating member, an extending member affixed to said second oscillating member providing pivotal connection between said oscillating members and extending into said slot for engagement with said first oscillating member, and means manually controllable from the exterior of the taximeter for selectively positioning said extending member within said slot, the path of adjustment of the extending member providing the pivotal connection extending from a position coincident with the axis of oscillation of said first member, said second oscillating member being in driving engagement with said fare registering mechanism, the extent of operative movement of said fare registering mechanism in relation to the distance travelled by the vehicle being adjustable from zero operative movement by adjustment of the position of said extending member in said slot from a position coincident with said axis of oscillation.

4. A taximeter adapted for installation in a vehicle, including a fare registering mechanism and means driven by said vehicle for operating said fare registering mechanism, said means comprising a first oscillating member adapted to be oscillated a predetermined number of oscillations for each unit of distance travelled by the vehicle, irrespective of the tariff rate setting of the meter and the diameter of the road wheels of the vehicle; a second oscillating member; a pivotal connection between said oscillating members, said second oscillating member being driven by said first oscillating member through said pivotal connection and being in driving engagement with said fare registering mechanism; and means for adjusting the position of said pivotal connection with respect to the centre of oscillation of said first oscillating member to vary the extent of travel of said second oscillating member, the extent of operative movement of said fare registering mechanism in relation to the distance travelled by the vehicle being adjustable by adjustment of the position of said pivotal connection.

5. A taximeter adapted for installation in a vehicle, including a fare registering mechanism and means driven by said vehicle for operating said fare registering mechanism, said means comprising a first oscillating member adapted to be oscillated a predetermined number of oscillations for each unit of distance travelled by the vehicle, irrespective of the tariff rate setting of the meter and the diameter of the road wheels of the vehicle; interchangeable gear means for adjusting the number of oscillations of said first oscillating member per unit of distance travelled by the vehicle to said predetermined number, the vehicle drive being transmitted to said first oscillating member through said interchangeable gear means; a second oscillating member; a pivotal connection between said oscillating members, said second oscillating member being driven by said first oscillating member through said pivotal connection and being in driving engagement with said fare registering mechanism; and a manually operated mechanism for selectively adjusting the position of said pivotal connection with respect to the centre of oscillation of said first oscillating member to vary the extent of travel of said second oscillating member, the extent of operative movement of said fare registering mechanism in relation to the distance travelled by the vehicle being adjustable by adjustment of the position of said pivotal connection.

6. A taximeter adapted for installation in a vehicle, including a fare registering mechanism and means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle; a member; means mounting said member eccentrically on said driving element, said mounting means providing for adjustment of the degree of eccentricity of said eccentrically mounted member; a first oscillating member driven by said eccentrically mounted member; a second oscillating member; a pivotal connection between said oscillating members, said second oscillating member being driven by said first oscillating member through said pivotal connection and being in driving engagement with said fare registering mechanism; and means for adjusting the position of said pivotal connection with respect to the centre of oscillation of said first oscillating member to vary the extent of travel of said second oscillating member, the extent of operative movement of said fare registering mechanism in relation to the distance travelled by the vehicle being adjustable by adjustment of the position of said pivotal connection and also by adjustment of said degree of eccentricity.

7. A taximeter adapted for installation in a vehicle, including a fare registering mechanism and means driven by said vehicle for operating said fare registering mechanism, said means comprising a first oscillating member adapted to be oscillated a predetermined number of oscillations for each unit of distance travelled by the vehicle, irrespective of the tariff rate setting of the meter and the diameter of the road wheels of the vehicle; a second oscillating member; a pivotal connection between said oscillating members, said second oscillating member being driven by said first oscillating member through said pivotal connection and being in driving engagement with said fare registering mechanism; and manually operated mechanism for selectively adjusting the position of said pivotal connection with respect to the axis of oscillation of said first oscillating member to vary the extent of travel of said second oscillating member in response to the travel of said first oscillating member, said manually operated mechanism including a cam positioned by a manually operated member extending outside of the meter case and a lever positioned by said cam, said lever positioning said pivotal connection, whereby the extent of operative movement of said fare registering mechanism in relation to the distance travelled by the vehicle is adjustable by said manually operated member.

8. A taximeter adapted for installation in a vehicle, including a fare registering mechanism and means driven by said vehicle for operating said fare registering mechanism, said means comprising a first oscillating member adapted to be oscillated a predetermined number of oscillations for each unit of distance travelled by the vehicle, irrespective of the tariff rate setting of the meter and the diameter of the road wheels of the vehicle; a second oscillating member; a pivotal connection between said oscillating members, said second oscillating member being driven by said first oscillating member through said pivotal connection and being in driving engagement with said fare registering mechanism; and manually operated mechanism for selectively adjusting the position of said pivotal connection with respect to the axis of oscillation of said first oscillating member to vary the extent of travel of said second oscillating member in response to the travel of said first oscillating member, said manually operated mechanism including a cam selectively positioned to any one of three operating positions by a manually operated member extending outside of the meter case and a lever positioned by said cam, said lever positioning said pivotal connection in one of three predetermined positions, the extent of operative movement of said fare registering mechanism in relation to the distance travelled by the vehicle being determined by the manual section of one of the three cam operating positions.

9. A taximeter adapted for installation in a vehicle, including a fare registering mechanism and means driven by said vehicle for operating said fare registering mechanism, said means comprising a first oscillating member adapted to be oscillated a predetermined number of oscillations for each unit of distance travelled by the vehicle, irrespective of the tariff rate setting of the meter and the diameter of the road wheels of the vehicle; a slot in said first oscillating member extending from the axis of oscillation of said member, a second oscillating member, an extending member affixed to said second oscillating member providing pivotal connection between said oscillating members and extending into said slot for engagement with said first oscillating member, and means manually controllable from the exterior of the taximeter for selectively positioning said extending member within said slot, the path of adjustment of the extending member providing the pivotal connection extending from a position coincident with the axis of oscillation of said first member, said second oscillating member being in driving engagement with said fare registering mechanism, the extent of operative movement of said fare registering mechanism in relation to the distance travelled by the vehicle being adjustable from zero operative movement by adjustment of the position of said extending member in said slot from a position coincident with said axis of oscillation.

10. A taximeter adapted for installation in a vehicle, including a fare registering mechanism and means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle; a member; means mounting said member eccentrically on said driving element, said mounting means providing for adjustment of the degree of eccentricity of said eccentrically mounted member; a first oscillating member driven by said driving element, a second oscillating member; a pivotal connection between said oscillating members, said second oscillating member being driven by said first oscillating member through said pivotal connection and being in driving engagement with said fare registering mechanism; and manually operated mechanism for selectively adjusting the position of said pivotal connection with respect to the axis of oscillation of said first oscillating member to vary the extent of travel of said second oscillating member in response to the travel of said first oscillating member, said manually operated mechanism including a cam positioned by a manually operated member extending outside of the meter case and a lever positioned by said cam, said lever positioning said pivotal connection, whereby the extent of operative movement of said fare registering mechanism in relation to the distance travelled by the vehicle is adjustable by said manually operated member and also by adjustment of said degree of eccentricity.

11. A taximeter adapted for installation in a vehicle, including a fare registering mechanism and means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle; a member; means mounting said member eccentrically on said driving element, said mounting means providing for adjustment of the degree of eccentricity of said eccentrically mounted member; a first oscillating member driven by said driving element, a slot in said first oscillating member extending from the axis of oscillation of said member, a second oscillating member, an extending member affixed to said second oscillating member providing pivotal connection between said oscillating members and extending into said slot for engagement with said first oscillating member, and means manually controllable from the exterior of the taximeter for selectively positioning said extending member within said slot, the path of adjustment of the extending member providing the pivotal connection extending from a position coincident with the axis of oscillation of said first member, said second oscillating member being in driving engagement with said fare registering mechanism, the extent of operative movement of said fare registering mechanism in relation to the distance travelled by the vehicle being adjustable from zero operative movement by adjustment of the position of said extending member in said slot from a position coincident with said axis of oscillation and also by adjustment of said degree of eccentricity.

12. A taximeter adapted for installation in a vehicle, including a fare registering mechanism; means driven by said vehicle for operating said fare registering mechanism; and a gear train adapted to be driven by a clock, said gear train driving said registering mechanism and including a first gear driven by the clock drive, a second gear driving said registering mechanism, an intermediate gear, and means mounting said intermediate gear for providing for movement of said intermediate gear out of mesh with said second gear by the action of said second gear when said second gear is overrunning said first gear.

13. A taximeter adapted for installation in a vehicle including a meter framework; a fare registering mechanism; means driven by said vehicle for operating said fare registering mechanism, and a gear train occupying an exterior position relative to said meter framework and adapted to be driven by a clock, said gear train driving said registering mechanism and including a first gear driven by the clock drive, a second gear driving said registering mechanism, an intermediate gear, and means mounting said intermediate gear for providing for movement of said intermediate gear out of mesh with said second gear by the action of said second gear when said second gear is overrunning said first gear and for permitting change of at least one of said first and second gears on its mounting with another gear having a different number of teeth to provide change of the gear ratio of said gear train.

14. A taximeter adapted for installation in a vehicle, including a meter framework; a fare registering mechanism; means driven by said vehicle for operating said fare registering mechanism; and a gear train occupying an exterior position relative to said meter framework and adapted to be driven by a clock, said gear train driving said registering mechanism and including a gear driven by the clock drive, a second gear driving said registering mechanism, an intermediate gear and means mounting said intermediate gear comprising a pivotally mounted arm providing for movement of said intermediate gear out of mesh with said second gear by the action of said second gear when said second gear is overrunning said first gear, said intermediate gear being adjustably mounted on said arm for permitting change of at least one of said first and second gears on its mounting with another gear having a different number of teeth to provide change of the gear ratio of said gear train.

15. A taximeter adapted for installation in a vehicle including a fare registering mechanism; means driven by said vehicle for operating said fare registering mechanism; and a gear train adapted to be driven by a clock, said means driven by said vehicle comprising an eccentrically mounted driving element adapted to be driven a predetermined number of revolutions for each unit of distance travelled by the vehicle, irrespective of the tariff rate setting of the meter and the diameter of the road wheels of the vehicle, a first oscillating member driven by said driving element, a second oscillating member driven by said first oscillating member, and a ratchet wheel, said second oscillating member comprising a pawl, said pawl being yieldingly held in driving engagement with said ratchet wheel, and said ratchet wheel driving said fare registering mechanism through the intermediary of a rotatable member, said gear train also driving said fare registering mechanism through the intermediary of said rotatable member and including a first gear driven by the clock drive, a second gear in driving connection with said rotatable member and through this member with said ratchet wheel, an intermediate gear and means mounting said intermediate gear for providing for movement of said intermediate gear out of mesh with said second gear by the action of said second gear when the pawl drive through said ratchet wheel to said fare registering mechanism is overrunning the clock drive thereto through said second gear, and said yielding pawl permitting the ratchet wheel to ride out of mesh with the pawl when the clock drive overruns the vehicle drive.

16. A taximeter adapted for installation in a vehicle including a meter framework; a fare registering mechanism; means driven by said vehicle for operating said fare registering mechanism; and a gear train occupying an exterior position relative to said meter framework and adapted to be driven by a clock, said means driven by said vehicle comprising an eccentrically mounted driving element adapted to be driven a predetermined number of revolutions for each unit of distance travelled by the vehicle, irrespective of the tariff rate setting of the meter and the diameter of the road wheels of the vehicle, a first oscillating member driven by said driving element, a second oscillating member driven by said first oscillating member, and a ratchet wheel, said second oscillating member comprising a pawl, said pawl being yieldingly held in driving engagement with said ratchet wheel, and said ratchet wheel driving said fare registering mechanism through the intermediary of a rotatable member, said gear train also driving said fare registering mechanism through the intermediary of said rotatable member and including a first gear driven by the clock drive, a second gear in driving connection with said rotatable member and through this member with said ratchet wheel, an intermediate gear and means mounting said intermediate gear for providing for movement of said intermediate gear out of mesh with said second gear by the action of said second gear when the pawl drive through said ratchet wheel to said fare registering mechanism is overrunning the clock drive thereto through said second gear, and for permitting change of at least one of said first and second gears on its mounting with another gear having a different number of teeth to provide change of the gear ratio of said gear train.

17. A taximeter adapted for installation in a vehicle, including a meter framework; a fare registering mechanism; means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle; a member; means mounting said member eccentrically on said driving element, said mounting means providing for adjustment of the degree of eccentricity of said eccentrically mounted member, a first oscillating member driven by said eccentrically mounted member, a second oscillating member driven by said first oscillating member, and a ratchet wheel, said second oscillating member including a pair of simultaneously reciprocatable pawls and means yieldably urging said pawls into driving engagement with said ratchet wheel, said pawls imparting drive alternately to said ratchet wheel as said second oscillating member oscillates, the pawl which in any given stroke of reciprocation of the member is out of said driving engagement functioning as a detent pawl relatively to the ratchet wheel, said second oscillating member being pivotally connected to said first oscillating member by a pivot which is adjustable towards and away from the axis of oscillation of that member to vary the throw of the pawls, said ratchet wheel driving said fare registering mechanism through the intermediary of a rotatable member; and a gear train occupying an exterior position relative to said meter framework and adapted to be driven by a clock, said gear train also driving said fare registering mechanism through the intermediary of said rotatable member and including a first gear driven by the clock drive, a second gear in driving connection with said rotatable member and through this member with said ratchet wheel, an intermediate gear, and means mounting said intermediate gear for providing for movement of said intermediate gear out of mesh with said second gear by the action of said second gear when the pawl drive through said ratchet wheel to said fare registering mechanism is overrunning the clock drive thereto through said second gear and for permitting change of at least one of said first and second gears on its mounting with another gear having a different number of teeth to provide change of the gear ratio of said gear train.

18. A taximeter adapted for installation in a vehicle, including a fare registering mechanism and means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle, a rotatable member carried upon said driving element in fixed relation thereto; a coupling member carrying a bearing surface whose profile contour is circular, said coupling member being carried upon said rotatable member with the axis of circularity of said bearing surface eccentric and parallel to the common axis of rotation of the driving element and rotatable member, and the path of rotation of said coupling member around said common axis of rotation as the driving element and rotatable member rotate being in a plane which is perpendicular to said common axis and said coupling member being displaceably mounted upon the rotatable member so as to be adjustable thereon towards and away from said common axis to vary at will the degree of eccentricity of said axis of circularity of the bearing surface relatively thereto; an oscillating member in continuous driving engagement with said coupling member, said driving engagement being at said bearing surface whereby variation of said degree of eccentricity produces proportional variation of the angle of oscillation of said oscillating member, said oscillating member driving said fare registering mechanism with the result that the extent of operative movement of said mechanism in relation to the distance travelled by the vehicle is adjusted in consequence of adjustment of said degree of eccentricity.

19. A taximeter adapted for installation in a vehicle, including a fare registering mechanism and means driven by said vehicle for operating said fare registering mechanism, said means comprising a rotatable driving element adapted to be driven a predetermined number of revolutions for each unit of distance travelled by the vehicle, irrespective of the tariff rate setting of the meter and the diameter of the road wheels of the vehicle, a rotatable member in driving connection with said driving elements, said rotatable member being mounted for rotation in a predetermined plane; an oscillating member; means for coupling said rotatable member in driving engagement with said oscillating member, the position of coupling on the rotatable member traversing a path during rotation of said member which is eccentric relative to the axis of rotation of said rotatable member; means for adjusting the position of coupling relative to said axis of rotation thereby varying the eccentricity of said path; a ratchet wheel in driving engagement with said fare registering mechanism; a pair of oppositely acting pawls pivotally connected in tandem through a pivot common to them both to said oscillating member for simultaneous reciprocation thereby in the same direction; and means yieldably urging one pawl into driving engagement with one side of said ratchet wheel during movement of the pawls in one direction and yieldably urging the other pawl into driving engagement with the opposite side of said ratchet wheel during movement of the pawls in the opposite direction, that pawl which is out of driving engagement at any time functioning as a detent pawl relatively to the ratchet wheel.

20. A taximeter adapted for installation in a vehicle including a fare registering mechanism and means driven by said vehicle for operating said fare registering mechanism, said means comprising an oscillating member adapted to be oscillated a predetermined number of oscillations for each unit of distance travelled by the vehicle, irrespective of the tariff rate setting of the meter and the diameter of the road wheels of the vehicle; a ratchet wheel driving said fare registering mechanism, a pair of oppositely acting pawls pivotally connected in tandem through a pivot common to them both to said oscillating member for simultaneous reciprocation thereby in the same direction; and means yieldably urging one pawl into engagement with one side of said of said ratchet wheel during movement of the pawls in one direction and yieldably urging the other pawl into driving engagement with the opposite side of said ratchet wheel during movement of the pawls in the opposite direction, that pawl which is out of driving engagement at any time functioning as a detent pawl relatively to the ratchet wheel.

References Cited in the file of this patent

UNITED STATES PATENTS

| Number | Name | Date |
|---|---|---|
| 183,960 | Nedler | Oct. 31, 1876 |
| 450,602 | Dencker et al. | Apr. 14, 1891 |
| 870,387 | Schneider | Nov. 5, 1907 |
| 1,271,920 | Maxwell | July 9, 1918 |
| 1,436,646 | Bruhn | Nov. 28, 1922 |
| 1,652,896 | Higginson | Dec. 13, 1927 |
| 1,794,808 | Tingley | Mar. 3, 1931 |
| 2,157,021 | Schmarion | May 2, 1939 |
| 2,315,569 | White | Apr. 6, 1943 |
| 2,428,080 | Horn | Sept. 30, 1947 |
| 2,583,966 | Rhoads | Jan. 29, 1952 |

FOREIGN PATENTS

| Number | Country | Date |
|---|---|---|
| 1,344 | Great Britain | 1914 |